(12) United States Patent
Murphy

(10) Patent No.: US 7,203,245 B1
(45) Date of Patent: *Apr. 10, 2007

(54) SYMBOL BOUNDARY DETECTOR METHOD AND DEVICE FOR OFDM SYSTEMS

(75) Inventor: Timothy F. Murphy, Ramona, CA (US)

(73) Assignee: 3Com Corporation, Marlborough, MA (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/403,552

(22) Filed: Mar. 31, 2003

(51) Int. Cl.
*H04K 1/10* (2006.01)
*H04B 1/38* (2006.01)

(52) U.S. Cl. ...................... 375/260; 375/219
(58) Field of Classification Search ........... 375/260, 375/232, 229; 370/206, 386; 455/403, 452
See application file for complete search history.

(56) References Cited

U.S. PATENT DOCUMENTS

| | | | |
|---|---|---|---|
| 5,488,662 A | 1/1996 | Fox et al. | |
| 5,946,344 A | 8/1999 | Warren et al. | |
| 5,982,807 A | 11/1999 | Snell | |
| 6,577,650 B1 * | 6/2003 | Tate et al. | 370/509 |
| 2002/0075974 A1 | 6/2002 | Mill | |
| 2002/0114355 A1 | 8/2002 | Kim et al. | |
| 2002/0159531 A1 | 10/2002 | Reagan et al. | |
| 2002/0159540 A1 | 10/2002 | Chiodini | |
| 2002/0181633 A1 | 12/2002 | Trans | |

OTHER PUBLICATIONS

Heiskala, et al. OFDM Wireless LANs: A Theoretical and Practical Guide, pp. 31-46. Copyright 2002.
Heiskala, et al. OFDM Wireless LANs: A Theoretical and Practical Guide, pp. 106-122. Copyright 2002.
Van Nee et al. "OFDM for Wireless Multimedia Communications", pp. 73-93 Copyright 2000.

* cited by examiner

*Primary Examiner*—Khai Tran
(74) *Attorney, Agent, or Firm*—McDonnell Boehnen Hulbert & Berghoff LLP

(57) ABSTRACT

The present invention relates to the field of data communication electronics and to a wired or wireless signal transmitter or receiver and methods providing improved signal-to-noise ratio (SNR) performance for the reception of data packets transmitted in the form of symbols modulated onto a signal. More particularly, methods and methods are disclosed for detecting the preamble and symbol boundaries of received data packets encoded with OFDM and other multi-carrier symbol transmission systems. Also disclosed are combinations of sensitive preamble detection and data payload and/or signal field encoding methods to spread data redundantly, to improve reception under a low SNR condition. This invention may be applied to a variety of standards utilizing OFDM and similar technologies, including IEEE 802.11a, Hiperlan/2 and MMAC. Particular aspects of the present invention are disclosed in the claims, specification and drawings.

16 Claims, 15 Drawing Sheets

SYMBOL BOUNDARY DETECTOR METHOD AND DEVICE FOR OFDM SYSTEMS

CROSS-REFERENCE TO RELATED APPLICATIONS

This application is related to the commonly owned, concurrently filed U.S. patent applications Ser. No. 10/403,553 entitled "Preamble Detector Method and Device for OFDM Systems" by the same inventors; and Ser. No. 10/403,546, entitled "Symbol Spreading Method and Device for OFDM Systems" by the same inventors. The related applications are hereby incorporated by reference.

BACKGROUND OF THE INVENTION

The present invention relates to the field of data communication electronics and to a wired or wireless signal transmitter or receiver and methods providing improved signal-to-noise ratio (SNR) performance for the reception of data packets transmitted in the form of symbols modulated onto a signal. More particularly, methods and devices are disclosed for detecting the preamble and symbol boundaries of received data packets encoded with OFDM and other multi-carrier symbol transmission systems. Also disclosed are combinations of sensitive preamble detection and data payload and/or signal field encoding methods to spread data redundantly, to improve reception under a low SNR condition. This invention may be applied to a variety of standards utilizing OFDM and similar technologies, including IEEE 802.11a, 802.11g, Hiperlan/2 and MAC.

Orthogonal frequency division multiplexing (OFDM) is a spectrally efficient modulation scheme with applications in both wired and wireless communications. It is applied in existing wireless systems including IEEE 802.11a and 802.11g and is proposed for several next-generation wireless systems including IEEE 802.16, 4th generation cellular and digital television broadcasting. Because OFDM has high spectral efficiency, it is susceptible to various radio transmission impairment mechanisms.

Furthermore, the combination of data communications based on OFDM techniques with data protocols based on packets creates additional challenges. In particular, data protocols based on packets may include training preambles that a receiver detects and locks onto. Relatively brief preambles typically are specified to increase the relative payload capacity of a packet. Detecting and locking onto a short preamble is difficult because a receiver takes time to adapt to variations in the signal received. Inefficiency in detecting or locking onto a preamble can result in either missed or misinterpreted packets, leading to failure to establish communications, repeated retransmissions or a loss of signal. Efficiency can be expressed in terms of detecting and locking onto a preamble at a relatively low signal-to-noise ratio (SNR), which implies a greater signal range or resistance to noise.

Methods and devices may be designed that facilitate detection of a transmitted data packet preamble at a lower SNR, which is desirable for more efficient data transmission. A system that takes advantage of the structure of a preamble and facilitates their detection at a lower SNR, could adapt the data payload transmission protocol based on the available SNR.

Accordingly, an opportunity arises to develop methods and apparatus that efficiently detect and lock onto a preamble and that adapt data transmission to the available SNR.

SUMMARY OF THE INVENTION

The present invention relates to the field of data communication electronics and to a wired or wireless signal transmitter or receiver and methods providing improved signal-to-noise ratio (SNR) performance for the reception of data packets transmitted in the form of symbols modulated onto a signal. More particularly, methods and devices are disclosed for detecting the preamble and symbol boundaries of received data packets encoded with OFDM and other multi-carrier symbol transmission systems. Also disclosed are combinations of sensitive preamble detection and data payload and/or signal field encoding methods to spread data redundantly, to improve reception under a low SNR condition. This invention may be applied to a variety of standards utilizing OFDM and similar technologies, including IEEE 802.11a, 802.11g, 802.16, Hiperlan/2, MMAC, 4th generation cellular and digital television broadcasting. Particular aspects of the present invention are disclosed in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Glossary

ADC Analog to Digital Converter

AGC Automatic Gain Control

BBIC Baseband Integrated Circuit

FFT Fast Fourier Transform

F″ Denotes a fractional number of n bits such that:
$\pm 1 \equiv \pm 2^{n-1}(F'')$ FO Frequency Offset IIR Infinite Impulse Response NGI2 Number of received sample periods in a Guard Interval 2 symbol (32 when sampling at 20M samples/sec)

Nl Number of received sample periods in a Long Training Symbol (64 when sampling at 20M samples/sec)

Nl2 log 2(Nl)

Ns Number of received sample periods in a Short Training Symbol (16 when sampling at 20M samples/sec)

Ns2 log 2(Ns)

OFDM Orthogonal Frequency Division Multiplexing

PER Packet Error Rate

PLCP Physical Layer Control Protocol

RFIC Radio Frequency Integrated Circuit

SIR Signal to Interference Ratio

SNR Signal to Noise Ratio

An 802.11a receiver determines when a valid 802.11a preamble has been received, estimates and corrects for frequency offset, determines symbol boundaries, and trains the frequency domain equalizer. One aspect of the present invention discloses a synchronization scheme that is both a robust and accurate in its estimation of frequency offset (FO) and symbol boundaries in the presence of both channel and radio impairments.

Figure 1:
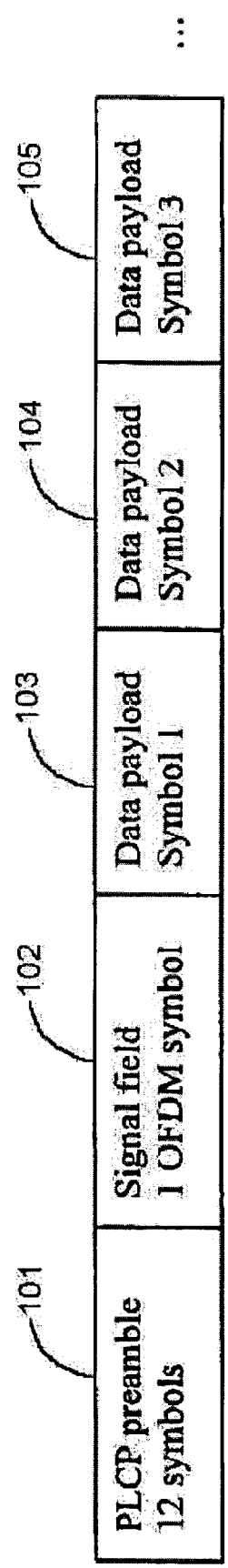
FIG. 1 depicts an 802.11a packet structure without symbol spreading.

FIG. 1 depicts a standard 802.11a or 802.11g frame. PLCP preamble 101 comprises Short and Long Training Symbols and a Guard Interval. The training symbols are followed by Signal field 102, containing the Rate and Length fields of the TxVector. The Rate field conveys the type of modulation and the coding rate used in the rest of the packet. A variable number of Data payload symbols 103–105, etc., follow Signal field 102, in accordance with the actual length of the packet's data payload and the 802.11a protocol specifications.

Figure 2:
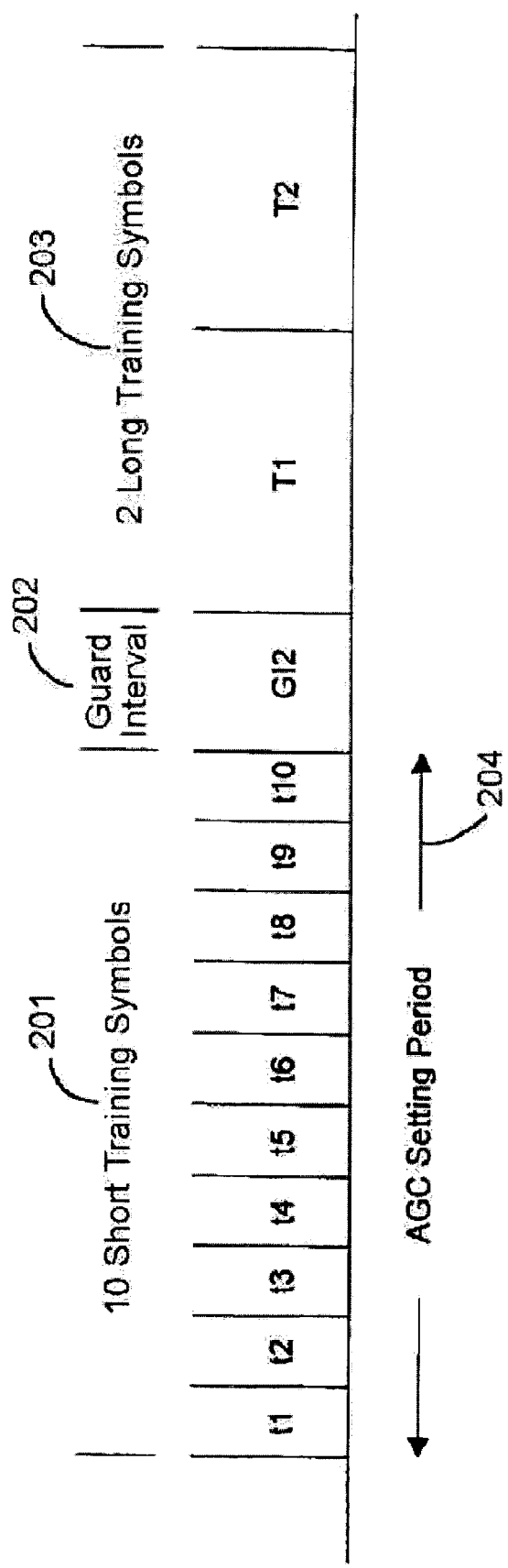
FIG. 2 depicts an AGC settling timeline with respect to the 802.11a preamble.

FIG. 2 depicts AGC settling period with respect to a timeline based on the 802.11a preamble structure. As shown, the AGC circuit of the radio receiver can be settling during the period when Short Training Symbols 201 are received.

Figure 3:
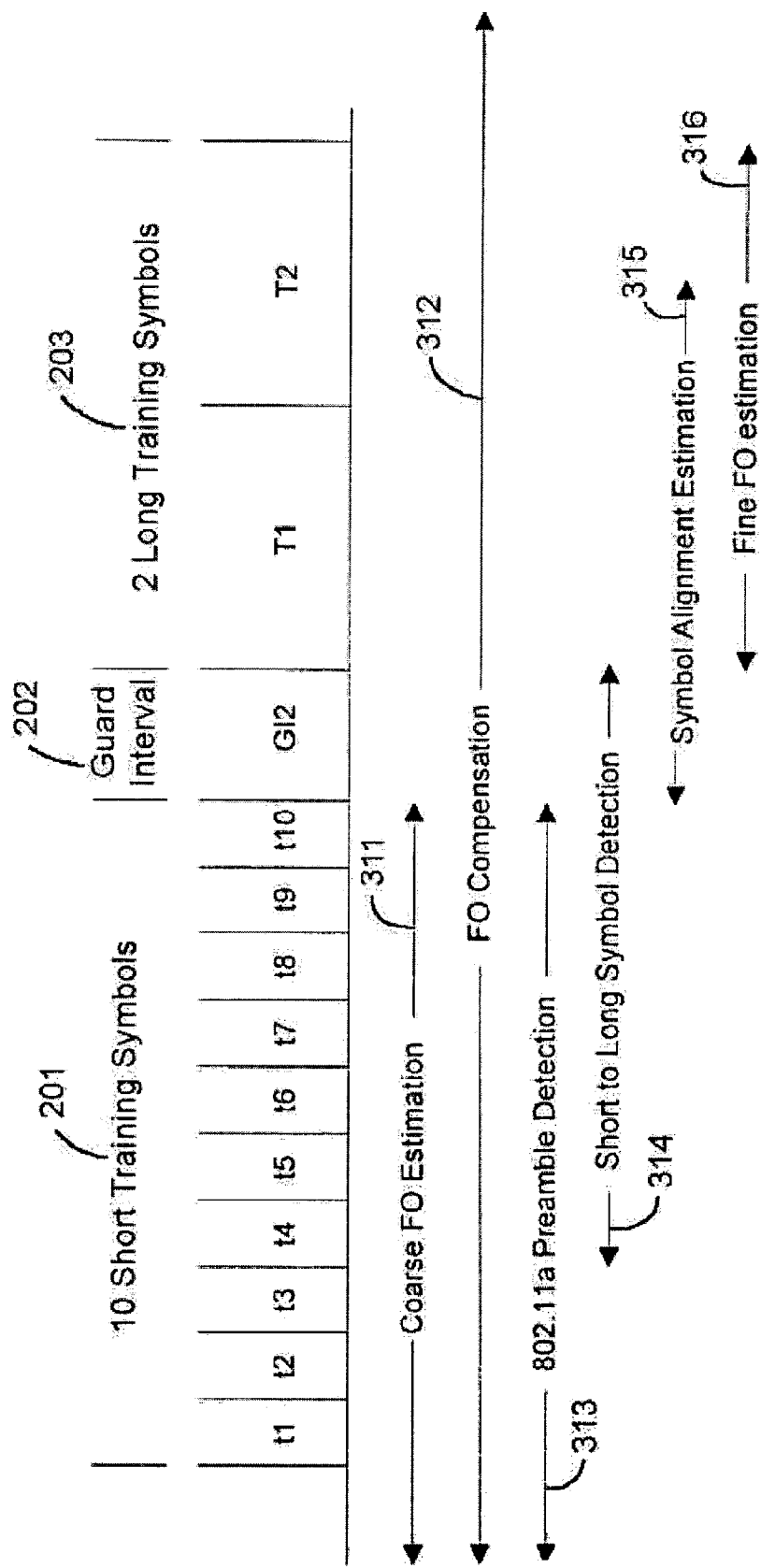
FIG. 3 depicts a preamble detection timeline with respect to the 802.11a preamble.
Figure 4:
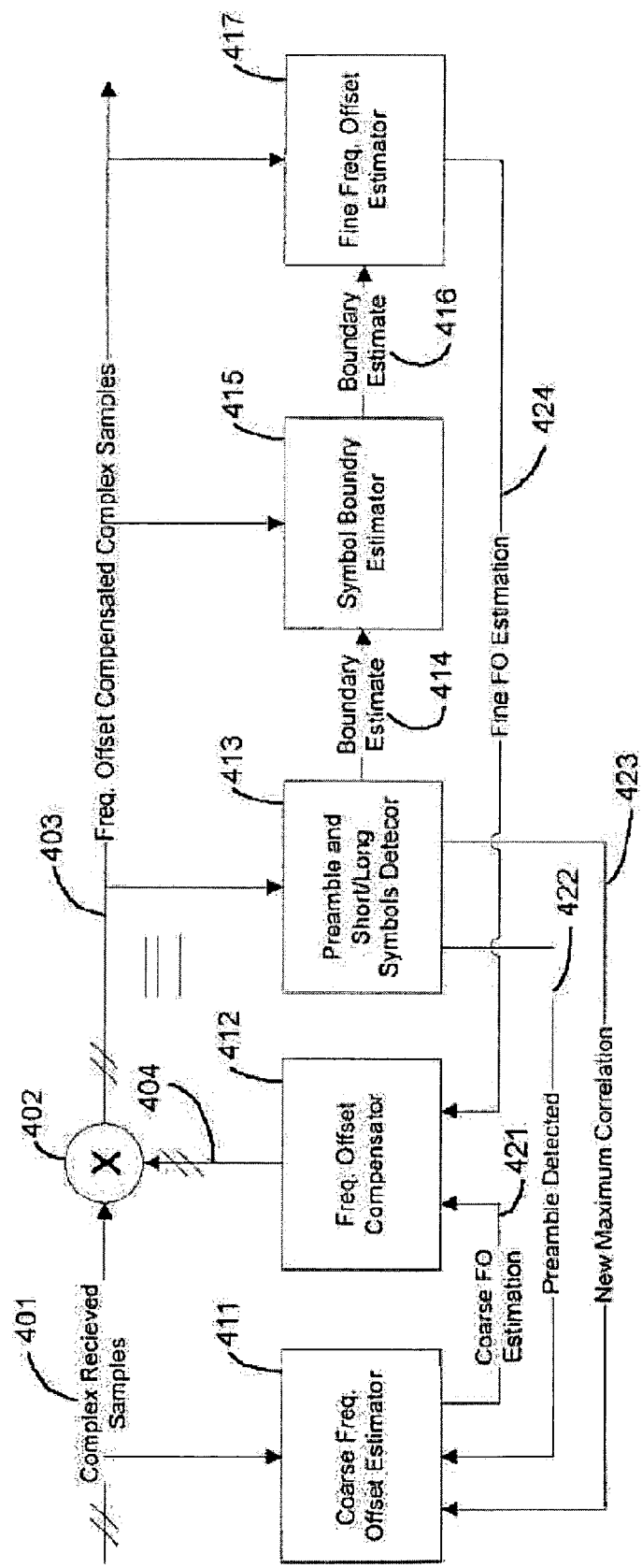
FIG. 4 depicts the high-level block diagram of a preamble detector.

FIG. 3 depicts a timeline based on the 802.11a preamble structure, which includes Short Training symbols 201, followed by GI2 Guard Interval 202, followed by Long Training symbols 203. Timelines 311–316 correspond to the operation of the high-level functional blocks as follows.

Timeline 311 corresponds to operation of the Coarse Frequency Offset Estimator, which is further explained below. The Coarse Frequency Offset Estimator is in operation selected to provide an integer number of samples within the FFT sampling interval and in the symbol interval. In some embodiments, the sequence of Complex Received Samples 401 is received by the preamble detector at a rate of approximately 20 million samples per second.

The appropriate sampling frequency for preamble detection relates to the signal bandwidth and the symbol duration. A short training symbol duration of 0.8 microseconds can be sampled 16 times utilizing a 20 MHz sampling rate. The sampling rate may be chose to generate, for instance, about 8, 16, 32, 48, 64 or more samples per training symbol, or to generate an integral number of samples in a range, such as 8–64 or 16–32 samples, or to generate 8 or more or 16 or more samples per training symbol. The requirements for an integral number of samples within the FFT sampling interval and the symbol interval, and the use of similar integral sampling rates and ranges is applicable to all symbols in a packet.

The sequence of uncompensated Complex Received Samples 401 is also processed by Coarse Frequency Offset Estimator 411, thereby producing a Coarse Frequency Offset Estimation 421 output signal, which drives the Frequency Offset Compensator 412.

The sequence of Frequency Offset Compensated Complex Samples 403 is coupled to inputs of the Preamble and Short/Long Symbols Detector 413, Symbol Boundary Estimator 415, and Fine Frequency Offset Estimator 417.

Preamble and Short/Long Symbols Detector 413 provides several output signals. Two of these output signals, Preamble Detected 422 and New Maximum Correlation 423, are coupled to inputs of Coarse Frequency Offset Estimator 411. Another output signal, Short/Long Boundary Estimate 414, is coupled to an input of Symbol Boundary Estimator 415. In turn, Symbol Boundary Estimator 415 provides output signal Boundary Estimate 416, which is coupled to an input of Fine Frequency Offset Estimator 417. Finally, Fine Frequency Offset Estimator 417 produces output signal Fine FO Estimation 424, which is coupled to an input of Frequency Offset Compensator 412.

Figure 5:
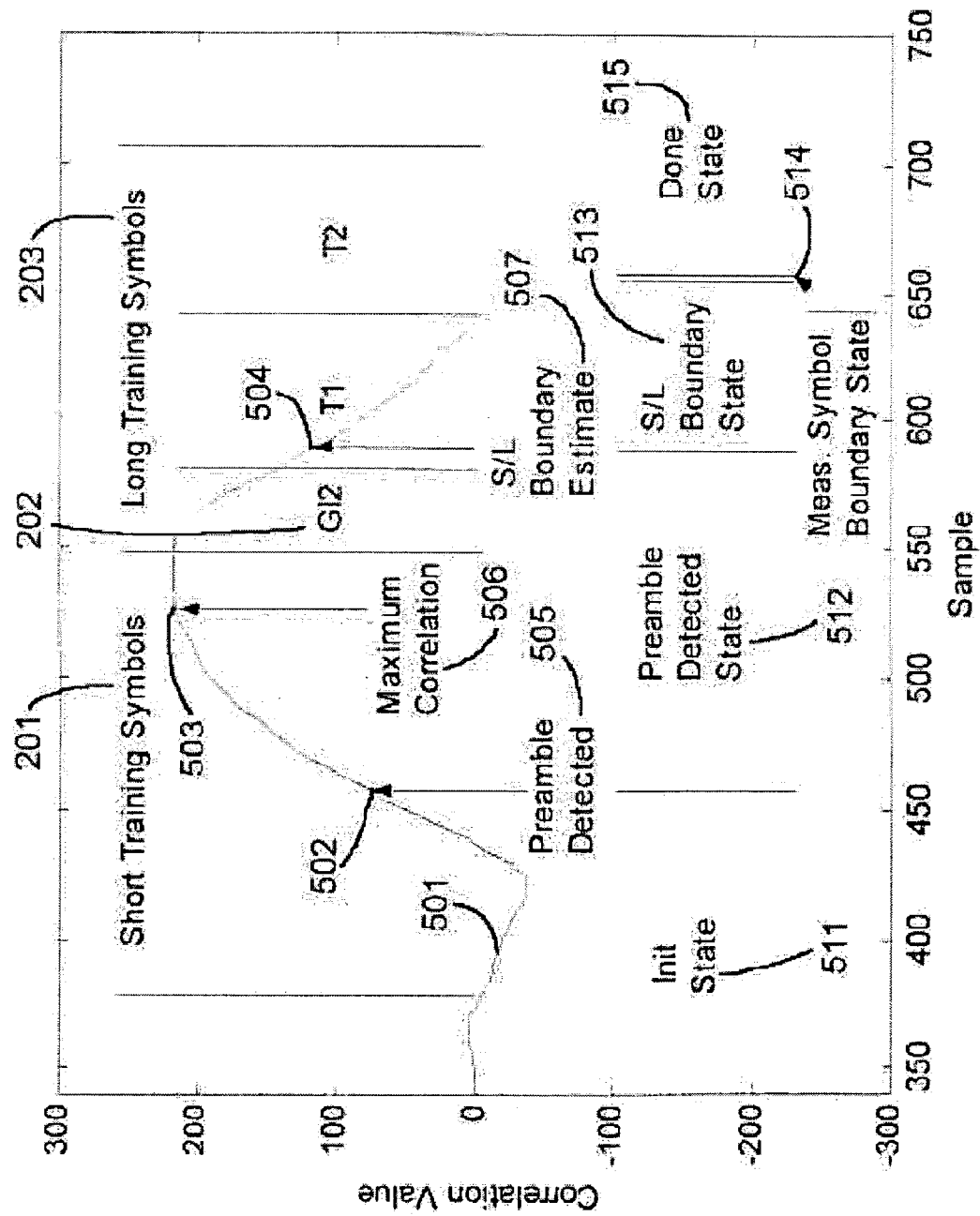
FIG. 5 depicts a sequence of operations with respect to the 802.11a preamble.

FIG. 5 depicts a sequence of events in relation to the 802.11a preamble structure, and further illustrates the interactions between the high-level blocks of the preamble detector. The X-axis represents time, measured by a relative count of the sequence number of Compensated Complex Samples 403. The Y-axis represents the output value of the filtered autocorrelator performed by the Preamble and Short/Long Symbols Detector, using as its input Frequency Offset Compensated Complex Samples 403. Function curve 501 represents the output value of the filtered autocorrelation over time, as other components improve their fix on the input signal.

The preamble detector enters Init State 511 when it is enabled to start the search for a new preamble. At the start of Init state 511, prior to receiving a sequence of Short Training Symbols 201, the value of function curve 501 is below a predetermined threshold 502. During Init State 511, the output value of function 501 may increase as a result of receiving repeated Short Training Symbols in Frequency Offset Compensated Samples 403. The Init state terminates when the output value of filtered autocorrelator 501 reaches threshold 502, shown as Preamble Detected event 505, which is indicated to other components by the assertion of output signal Preamble Detected 422.

The autocorrelator output value 501 may increase during Preamble Detected state 512, reaching a Maximum Correlation value 503 towards the end of the sequence of Short Training symbols 201. The value of function 501 increases when the symbols contained in Compensated Complex Received Samples 403 form a repeated sequence. During operation of the preamble detector, new values of function 501 are compared to a previously stored relative maximum output value. When the current value exceeds the previously stored maximum, the current value replaces the previous maximum, and these events may be indicated to other components by the assertion of output signal New Maximum Correlation 423. Optionally, the new value could be supplied to the other components, either for each new calculation or only when a new maximum results. Or, the other components could function independently, without feedback from the autocorrelator of the Preamble Detector.

After reaching Maximum Correlation value 503, the value of function 501 decreases during GI2 Guard Interval 202, because the symbols contained in Compensated Complex Received Samples 403 during this segment do not repeat the prior sequence. The Preamble Detected state ends approximately at the Boundary between GI2 Guard Interval 202 and the start of Long Training symbols 203, and this occurs approximately when the value of function 501 decreases to one-half the value of Maximum Correlation for a given Preamble. This is shown as function value 504 and S/L Boundary Estimate 507. This boundary detection or estimate event is indicated to other components by output signal S/L Boundary Estimate 414. Upon detection of the boundary, the preamble detector transitions from the Preamble Detected State 512 to the S/L Boundary State 513.

The preamble detector remains in the Short/Long Boundary State 513 for a selectable period lasting Nl Samples in this embodiment, after which it transitions to the Measure Symbol Boundary State 505. This transition is communicated to the Symbol Boundary Estimator 515, which then initiates the symbol boundary measurement. The preamble detector then transitions to the Done State 514 where it remains until it is re-enabled to detect another preamble.

Figure 6:
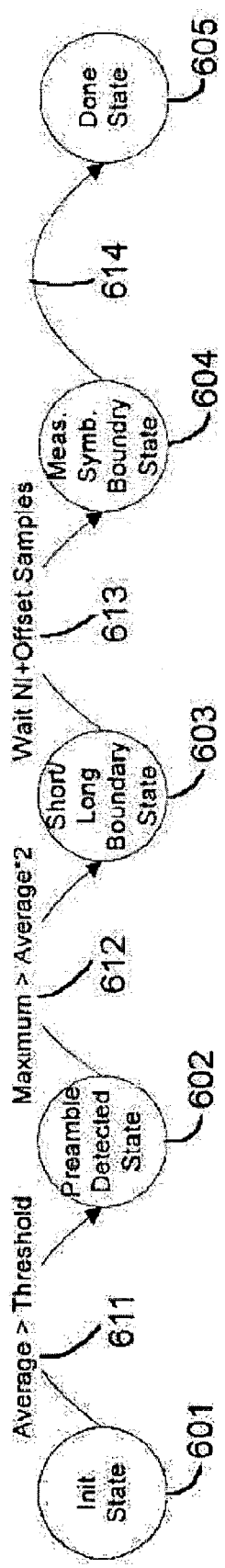
FIG. 6 depicts the Preamble Detector state machine.

FIG. 6 depicts the Preamble Detector state machine. The preamble detector enters Init State 601 when it is enabled to start the search for a new preamble. During Init State 601, the preamble detector performs a filtered autocorrelation on the received sequence of Short Training Symbols 201. When the autocorrelation output value exceeds predetermined threshold 502, the state machine performs transition 611 and enters Preamble Detected State 602.

The preamble detector continues to perform a filtered autocorrelation on the received sequence of Short Training Symbols 201 during Preamble Detected state 602, and new output values of the autocorrelator are compared to a previously stored relative maximum output value. Whenever the current value exceeds the previously stored maximum, the current value replaces the previous maximum. Reception of the sequence of Short Training Symbols 201 is followed by reception of GI2 Guard Interval 202, and because GI2 Guard Interval does not repeat the prior sequence, the output value of the autocorrelator decreases. When the value of function 501 decreases to a predetermined fraction, for example decreases to one-half, of the largest value stored for the Maximum Correlation for a given Preamble, the Preamble Detector state performs transition 612 and enters Short/Long Boundary State 603. Filtering of the autocorrelation assists in detecting the onset of reduced autocorrelation values, because it reduces noise and spurious events from the output value. Therefore, the onset of a reduction in the output value begins approximately when a repeated symbol sequence ends, and the stored maximum output value ceases to be updated.

The Preamble Detected state ends at an estimated time that approximately coincides with the boundary between GI2 Guard Interval 202 and the start of Long Training Symbols 203. The time at which the Preamble Detected state 602 ends is represented by a count which is established by the input sample number of the current Frequency Offset Compensated Complex Sample. A programmable offset value can be used to adjust this sample number, in order to ensure a closer coincidence in time between the end of the Preamble Detected State and the boundary between GI2 Guard Interval 202 and the start of Long Training symbols 203.

The preamble detector remains in the Short/Long Boundary State 603 for a period equal to Nl samples adjusted by the programmable offset value, after which it executes transition 613 to enter the Measure Symbol Boundary State 604. Transition 613 is communicated to the Symbol Boundary Estimator 415, thus initiating the symbol boundary measurement, after which transition 614 is performed to enter Done State 614 where the Preamble Detector remains until it is re-enabled to search for another preamble.

The complex conjugate of a complex number $z=a+bi$ is defined to be $$z^* = a - bi$$

Therefore, by definition the complex conjugate also satisfies $$(z^*)^* = z$$

Furthermore, complex conjugation is distributive over complex multiplication, $$(Z_1 Z_2)^* = Z_1^* Z_2^*$$

Figure 7:
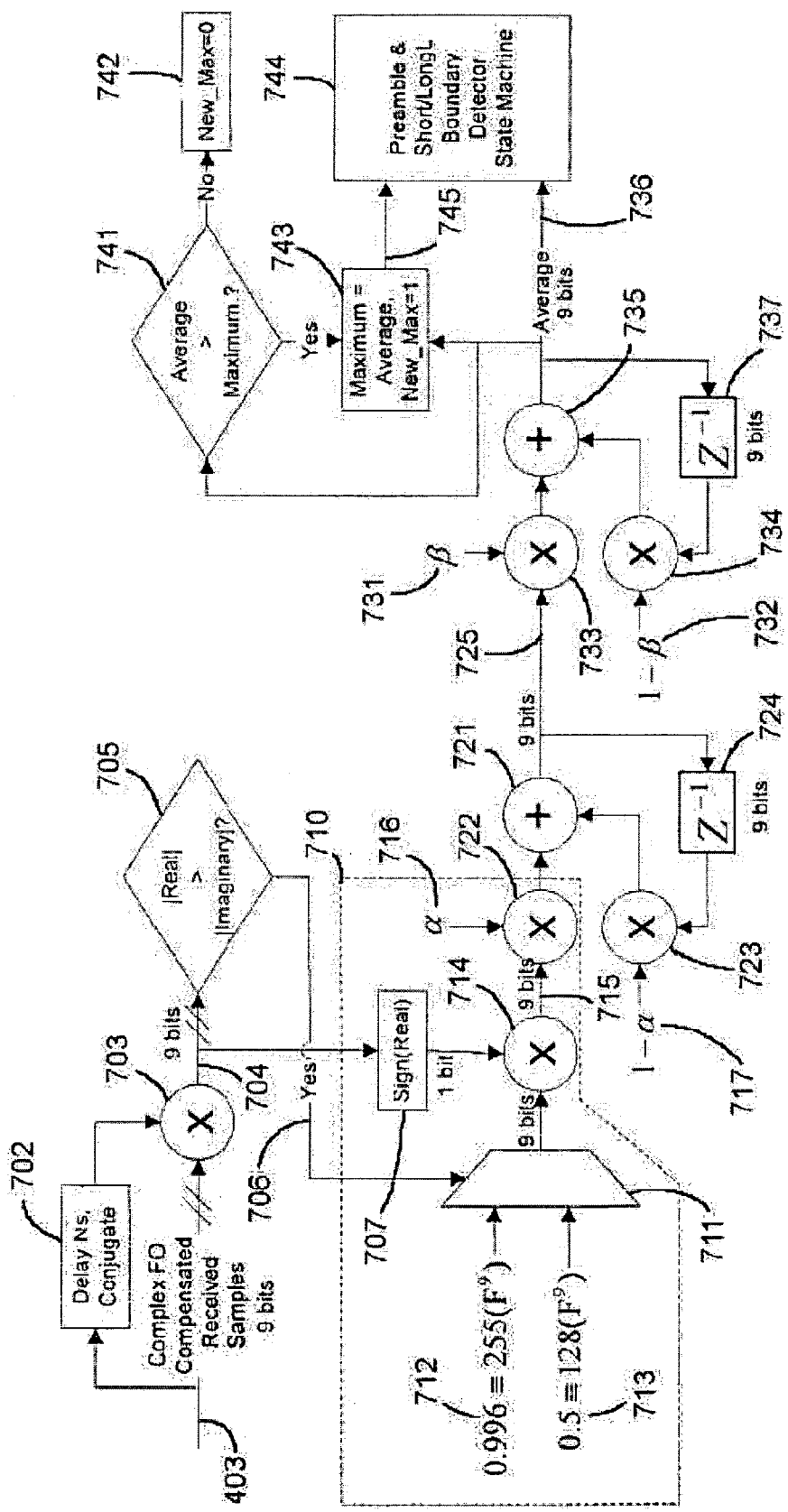
FIG. 7 depicts the block diagram of an embodiment of the Preamble and Short/Long Boundary Detector.

FIG. 7 depicts the block diagram of an embodiment of the Preamble and Short/Long Boundary Detector. A preamble is detected by performing an autocorrelation on the sequence of received complex samples 203, using a conjugate sample delay interval 702 that corresponds to the number of samples per symbol in Short Training Symbols 101. Selecting a sample delay latency that matches the period of a Short Training Symbol causes the detector function to respond with an increasing value to repeated symbols having that period. Thus, the detector function is tuned to respond to the Short Training Symbol period.

Complex Frequency Offset Received Samples 403 are input to delay line and conjugator 702, which conjugates and delays Complex Frequency Offset Received Samples 403, and outputs delayed complex conjugate samples 702. The product of the unconjugated 403 and conjugated samples 702, calculated by Multiplier 703, corresponds to an autocorrelation between the undelayed and delayed complex sample streams. Furthermore, the complex autocorrelation value calculated by Multiplier 703 can be used to detect the occurrence of Short Training Symbols, because the latency of the conjugator delay line 702 corresponds to the period of a Short Training Symbol.

FIG. 7 shows that for samples 403, each sample (denoted $S_n$) is multiplied by a delayed and conjugated sample (denoted $S_{n-Ns}^*$, where Ns represents the number of complex samples in a Short Training Symbol), to produce complex correlation values 704, $$x + iy = S_n S_{n-Ns}^*$$

Alternately, the conjugation and delay operations may be performed separately, because this results in the same sign for the real components in the complex products 704, $$x + iy = S_n^* S_{n-Ns}$$

Autocorrelation of two complex numbers corresponds to the angular difference between the two vectors corresponding to the numbers. The result of the autocorrelation is itself a complex number corresponding to a vector having an angle in the range of $-p$ to $p$ radians, and thus, the angle has an absolute magnitude in the range of 0 to $p$ radians. Accordingly, the complex output 704 of multiplier 703 corresponds to the angular difference between successive pairs of complex samples 403, and the samples comprising a pair are separated by an interval corresponding to the period of a Short Training Symbol. Thus, the autocorrelation result for successive sample pairs can be used to detect the occurrence of a repeating symbol, because the absolute magnitude of the angle represented by the autocorrelation result indicates the degree to which sample pairs are matched in phase. An in-phase condition for a pair of samples is indicated by an angle of 0 radians, and a complete out-of-phase condition is indicated by an angle with an absolute magnitude of $p$ radians.

Thus, the values in a sequence of complex samples, which represent a repeated symbol having the period of a Short Training Symbol, will lead to autocorrelation results corresponding to angles that approximate 0 radians. Conversely, the values in a sequence of complex samples that do not represent a repeated symbol, will lead to autocorrelation results corresponding to angles with absolute magnitudes in the range between 0 and p radians. Consequently, the angles corresponding to the autocorrelation results can be used to detect a repeated Short Training Symbol in the sequence of complex samples 403.

Computation of the angles can be simplified by classifying the autocorrelation results into a quadrant of the possible range of results, using two computation, and weighting the result according to the quadrant. One way of classifying the autocorrelation results involves using the sign function, as expressed by the following mathematical formulas:

$$f(x, y) = \begin{bmatrix} \text{sign}(x), & |x| \geq |y| \\ \dfrac{\text{sign}(x)}{2}, & |x| < |y| \end{bmatrix}$$

wherein the sign function returns the normalized sign (±1) of the independent variable x. Use of a different denominator and a variation on a normalized sign would change the weighting of angles falling in different quadrants. Additional steps could be added that would make the weighting unsymmetrical.

Alternatively, autocorrelation results can be classified using the complex angle function, as expressed by the following mathematical formulas:

$$f(x, y) = \begin{bmatrix} 1 & |\text{angle}(x + iy)| \leq 0.25\pi \\ 0.5 & 0.25\pi \leq |\text{angle}(x + iy)| < 0.5\pi \\ -0.5 & 0.5\pi \leq |\text{angle}(x, +iy)| < 0.75\pi \\ -1 & 0.75\pi \leq |\text{angle}(x, +iy)| < \pi \end{bmatrix}$$

FIG. 7 implements the second set of formulas. Comparator 705 compares the absolute magnitude of the real and imaginary portions of autocorrelation result 704, and the comparator's output signal 706 steers multiplexer 711, which accordingly outputs a value of one-half 713 or a value of approximately one 712. The output of multiplexer 711 is given a positive or negative sign by multiplier 714, in accordance with function 707 that provides the sign of the real component of autocorrelation result 704.

Alternatively, a look-up table can combine classification, weighting of the relative phase angle, and a first stage of filtering calculations. Element combination 710, which comprises multiplexer 711, real sign bit function 707, multiplier 714 and multiplier 722, can be realized using a look-up table containing four two bit values for the filter coefficient α, represented by Bit 1 and Bit 0, as follows:

| θ = angle (x + iy) | Bit 1 = sign (x) | Bit 0 = \|y\| > \|x\| | Table Entry | Using α = 8 (F⁹) |
|---|---|---|---|---|
| \|θ\| ≤ 0.25π | 0 | 0 | α | 8 (F⁹) |
| 0.25π ≤ \|θ\| < 0.5π | 0 | 1 | α/2 | 4 (F⁹) |
| 0.75π ≤ \|θ\| < π | 1 | 0 | −α | −8 (F⁹) |

-continued

| θ = angle (x + iy) | Bit 1 = sign (x) | Bit 0 = \|y\| > \|x\| | Table Entry | Using α = 8 (F⁹) |
|---|---|---|---|---|
| 0.5π ≤ \|θ\| < 0.75π | 1 | 1 | −α/2 | −4 (F⁹) |

In the above table, the value α is a filter parameter. Using fractions of a as table values avoids one multiplication operation. Of course, the table could be expanded to include greater precision for fractions of α, or the actual angle determined by the autocorrelation could be used directly, but this would require additional computations.

Binary fractional numbers are followed by F$^n$, which denotes a fractional number of n bits such that: $\pm 1 \equiv \pm 2^{n-1}$ (F$^n$). Multiplication of fractional numbers is performed as follows:

$$x(F^n) \times y(F^n) = \lfloor (x \times y)/2^{(n-1)} \rfloor (F^n)$$

Hence, a real fractional binary number of n bits will be in the range of $\pm [(2^{(n-1)}-1)/(2^{(n-1)}]$. Furthermore, the absolute magnitude of the number is represented by bits n−1 to bit 0, and the high-order n-th bit represents the sign of the number. A product 2n−1 bits long results from multiplying two fractional n-bit numbers represented in this manner. Using only the n-most significant bits from this multiplication result is equivalent to dividing by $2^{(n-1)}$, and thus, no additional work is required to perform a fractional multiplication.

In the embodiment shown in FIG. 7, the simplified angular correlation 715 is coupled to the input of two consecutive first-order averaging filters to produce smoothed continuous correlation function 501, in accordance with the following mathematical formulas:

$$z_1(n) = [1 - \alpha]z_1(n-1) + \alpha f(x,y)$$

$$z_2(n) = [1 - \beta]z_2(n-1) + \beta z_1(n)$$

In another embodiment, a second-order averaging filter could be utilized in place of the two consecutive first-order averaging filters described above. The response time and other characteristics of a second-order filter could differ from a pair of first-order filters. IT has been observed that a pair of first-order filters responds more quickly than a second-order filter to the reduction that occurs at the end of a repeated sequence of symbols. Other forms of autocorrelation filtering could be used to reduce noise and improve preamble detection.

The use of filtering or averaging to process the autocorrelation output reduces noise and other undesirable short-term "glitches" which could otherwise affect its utility in detecting a preamble and establishing the desired FFT frequency offset.

As shown in FIG. 7, an embodiment having two sequential first-order filters is implemented wherein the first first-order averaging filter is comprised of multipliers 722 and 723, adder 721, and unit delay function 724. Filter input 715 is multiplied by coefficient α Alpha 716, and the resulting product forms an input to adder 721. The other input to adder 721 is the product of coefficient 717 multiplied by the filter's own output 725, delayed one sample time by delay element 724. The second first-order averaging filter is comprised of multipliers 733 and 734, adder 735, and unit delay function 737. Filter input 725 is multiplied by coefficient Beta 731, and the resulting product forms an input to adder 735. The other input to adder 735 is the product of coefficient 731 multiplied by with the filter's own output 736, delayed one sample time by delay element 737.

Continuous correlation curve 501 corresponds to successive values of the second averaging filter's output 736. The current output value 736 is also an input to comparator 741, storage element 743, and state machine 744. The current output of the second averaging filter is compared to the Maximum stored for this Received Preamble, and if it is larger, a new maximum is stored in element 743 and this event is signaled by New Max flag 745 output signal, which is coupled to state machine 744.

Figure 8:
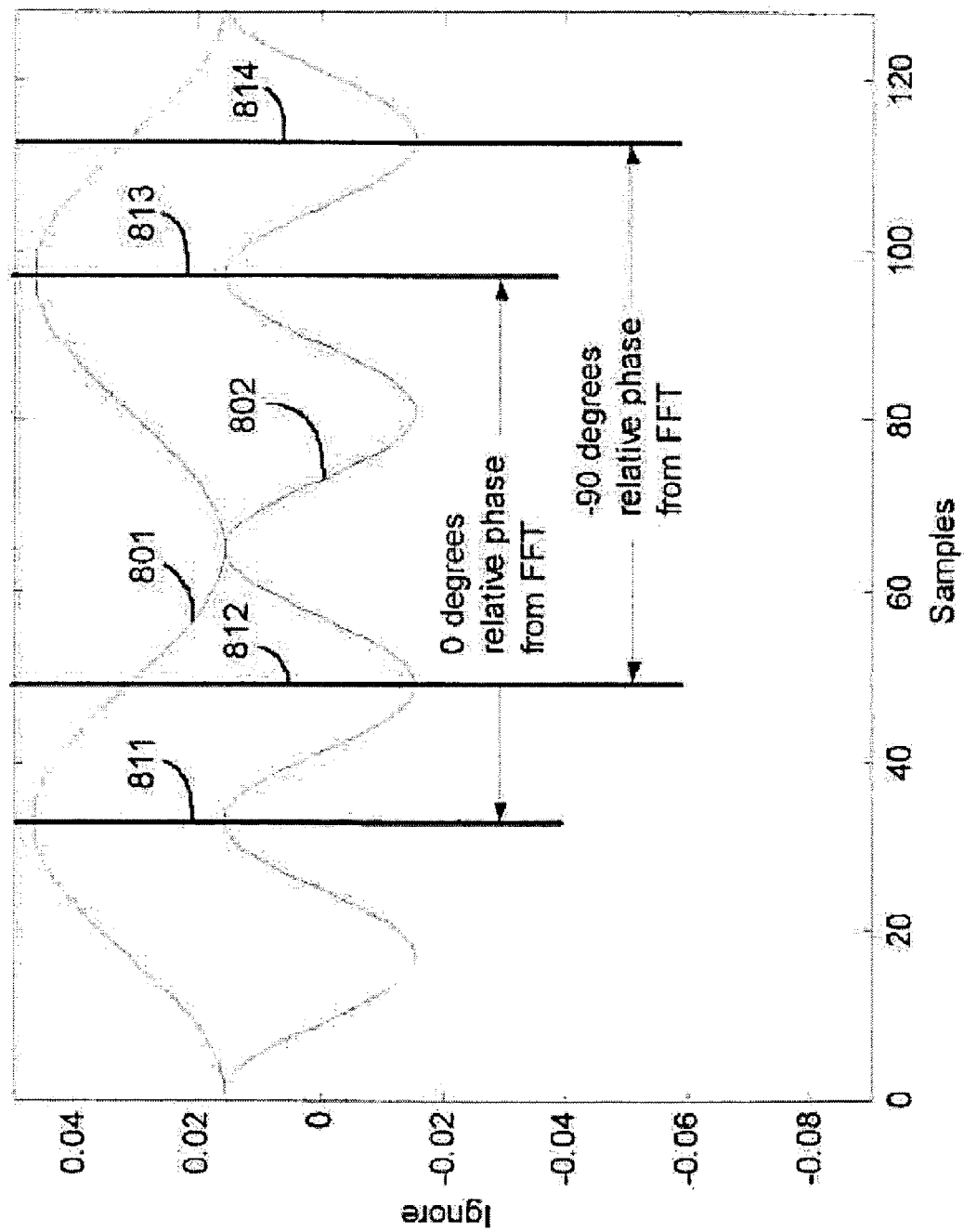
FIG. 8 depicts an example of two adjacent OFDM sub-carrier signals.

FIG. 8 depicts an example of two adjacent OFDM subcarrier signals, comprising a first subcarrier 801 and a second subcarrier 702. The X-axis represents time, measured as a sequence of complex samples, which might characterize the interval shown in a preferred embodiment. The Y-axis represents the relative signal amplitude of the subcarriers. As shown, markers 811 and 813 illustrate the boundaries of a first FFT sampling window, and are placed at 0 degrees relative phase to repeating OFDM symbols. Markers 812 and 814 illustrate the boundaries of a second FFT sampling window, and are placed at −90 degrees relative phase to repeating OFDM symbols.

FIG. 8 illustrates two OFDM subcarriers exhibiting the same amplitude and phase relative to an FFT sampling interval. The illustration makes it easy to see that the number of cycles in a relevant period is a different integer for each subcarrier. Of course, for the various OFDM subcarriers encoded with a signal, the amplitudes and phases relative to an FFT sampling interval may differ, because the amplitude may wander and the phase is modulated to carry information. As illustrated in FIG. 7, an OFDM subcarrier has an integral number of cycles in a symbol interval T. Typically, the number of cycles between adjacent subcarriers differs by one cycle. As shown in FIG. 8, between markers 811 and 813, subcarrier 802 has one more cycle than subcarrier 801. Likewise, although relatively shifted −90 degrees in phase, the same is true for the interval between markers 812 and 814.

In the transmission of a high-rate data stream using a multicarrier modulation scheme, the high-rate data stream is split into a set of lower-rate data streams, which are used to modulate a set of subcarriers. The resulting modulated subcarriers are then transmitted as subcarrier components of the modulated signal. Consequently, the modulated signal contains the high rate data stream within its modulated subcarriers. Upon reception, the lower-rate data streams are recovered from the modulated subcarriers, and are recombined to form the original high-rate data stream. Recovery of the individual lower-rate data streams includes separating the individual subcarriers from each other using an FFT function, which should be correctly aligned on symbol boundaries. Accordingly, alignment of the receiver's FFT sampling interval to the received symbol boundaries facilitates accurate data recovery.

Frequency Offset Compensated Complex Samples 403 are further processed by Symbol Boundary Estimator 415 to compute a Boundary Estimate 416. The Boundary Estimate is used as a starting point for the Fine Frequency Offset Estimator 417. The estimate need not be exact; it should be near the beginning of the first long training symbol and before the midpoint of that symbol. The Boundary Estimate 416, in this embodiment, is an integer used to adjust the position of the first sample of subsequent FFT sampling intervals.

Figure 9:
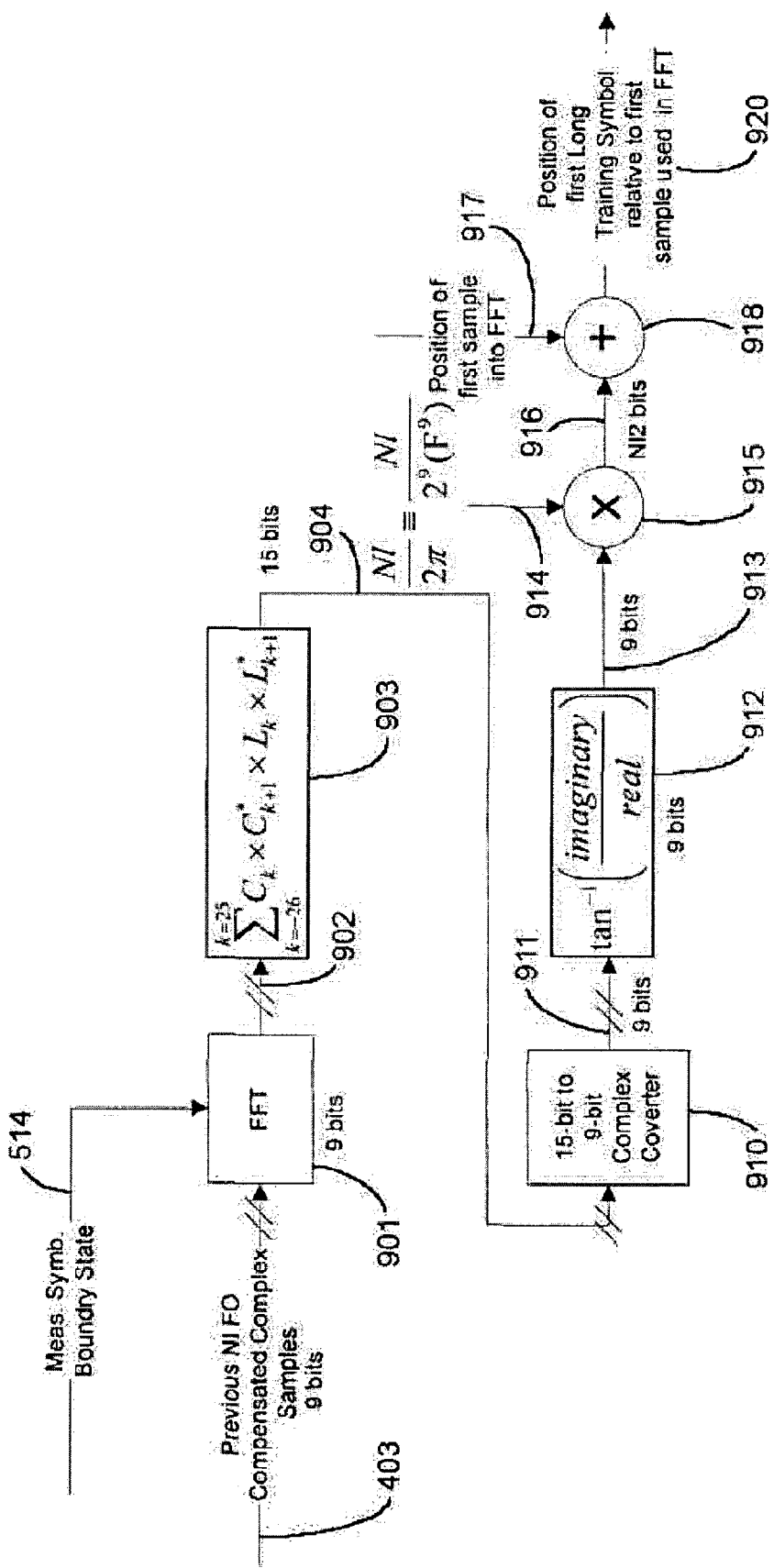
FIG. 9 depicts the block diagram of the Symbol Boundary Estimator.

FIG. 9 depicts the block diagram of Symbol Boundary Estimator 415. As shown, FFT function 901 processes received Frequency Offset Compensated Complex Samples 403 using a symbol interval whose boundaries are based on Short/Long Boundary Estimate 514. FFT function 901 computes received complex signal array 902 representing the received subcarrier modulation values of the individual subcarriers over a symbol interval. Average Phase Vector Calculator 903 receives consecutive received complex symbol arrays and computes the average relative phase angle 904 from the FFT output 902. If the symbol boundary is precisely aligned with the FFT sampling boundary, the relative phase angle, to the expected symbol is zero. Misalignment is calculated as a relative phase angle.

Average relative phase angle 904 is converted from a 15-bit to a 9-bit complex value by function 910, from which arc tangent function 912 computes real value phase angle 913. Multiplier 915 converts phase angle 913 to a number of samples 916, using normalization factor 914 representing the number of complex samples in a symbol interval. Adder 918 computes starting position 920 for the next FFT sampling interval, by adding sample number 916 to the starting position 917 of the current FFT sampling interval.

Figure 10:
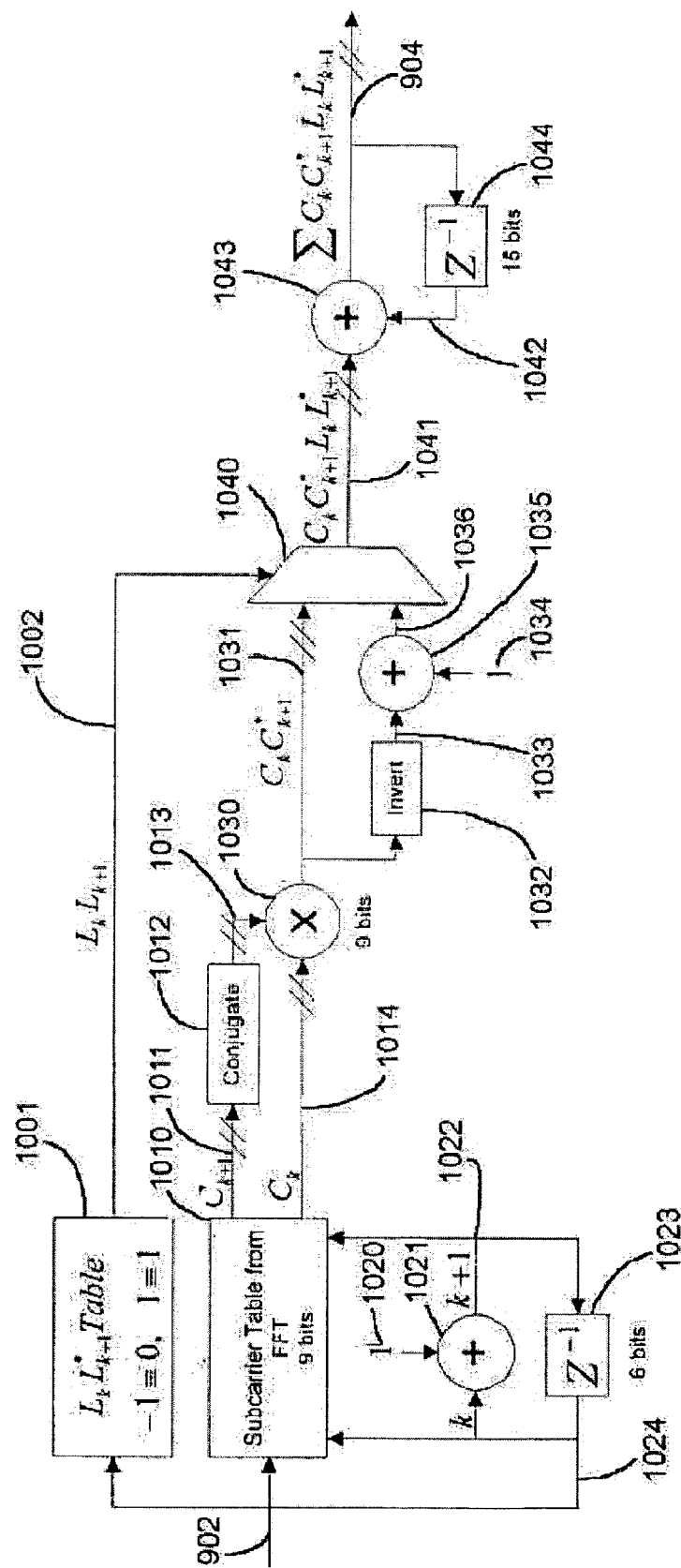
FIG. 10 is a block diagram of Relative Phase Vector Calculator embodiment.

FIG. 10 is a block diagram of an embodiment of Relative Phase Vector Calculator 903. A plurality of received subcarrier modulation values arrays 902, computed by FFT 901, are stored in subcarrier table 1010, and $L_k^*L_{k+1}$, Table 1001 stores the corresponding expected adjacent subcarrier modulation product values, which should be received from an ideal transmission when the relative phase angle is zero. Subcarrier table index pointers 1022 and 1024, in cooperation with incrementer 1021 and delay element 1023, are used to sequentially address the complex FFT output corresponding to pairs of adjacent subcarriers. Thus, the FFT results are stored in subcarrier table 1010, and the precomputed expected values $L_k^*L_{k+1}$, are stored in Table 1001.

Conjugator 1012 and multiplier 1030 perform a complex autocorrelation between adjacent received subcarriers modulation values, and the complex autocorrelation result 1031 is coupled to an input of multiplexer 1040. Expected subcarrier modulation value product table 1001 produces output signal 1002 in response to index pointer 1024. Output signal 1002 represents the expected subcarrier modulation sequence product value $L_k^*L_{k+1}$. Expected adjacent subcarrier modulation product values of −1 and 1 are represented by values of 0 or 1, respectively driven on output signal 1002 of $L_k^*L_{k+1}$ Table 1001. Signal 1002 controls multiplexer 1040, which selects between autocorrelation products 1031 and 1036. Complex product 1031 is produced by complex multiplier 1030, and represents the autocorrelation between two received adjacent subcarrier modulation values. Complex autocorrelation product 1036, coupled to a second input of multiplexer 1040, represents received complex autocorrelation product 1031 multiplied by −1, because inverter 1032 and incrementer 1035 compute the negated twos-complement of autocorrelation product 1031. Therefore, as selected by output signal 1002, the output signal 1041 of multiplexer 1040 is represents the complex multiplication product between the autocorrelation of received adjacent subcarrier modulation values and their expected symbol modulation values. Successive pairs of adjacent subcarrier relative phase vectors are obtained in this manner, and their sum over an entire received symbol is computed. Adder 1043 and delay element 1044 form an accumulator which computes the relative phase vector of an entire symbol, and its output signal 904 represents the average relative phase angle of the received symbol, with respect to the expected symbol stored in $L_k^*L_{k+1}$ Table 1001.

Figure 11:
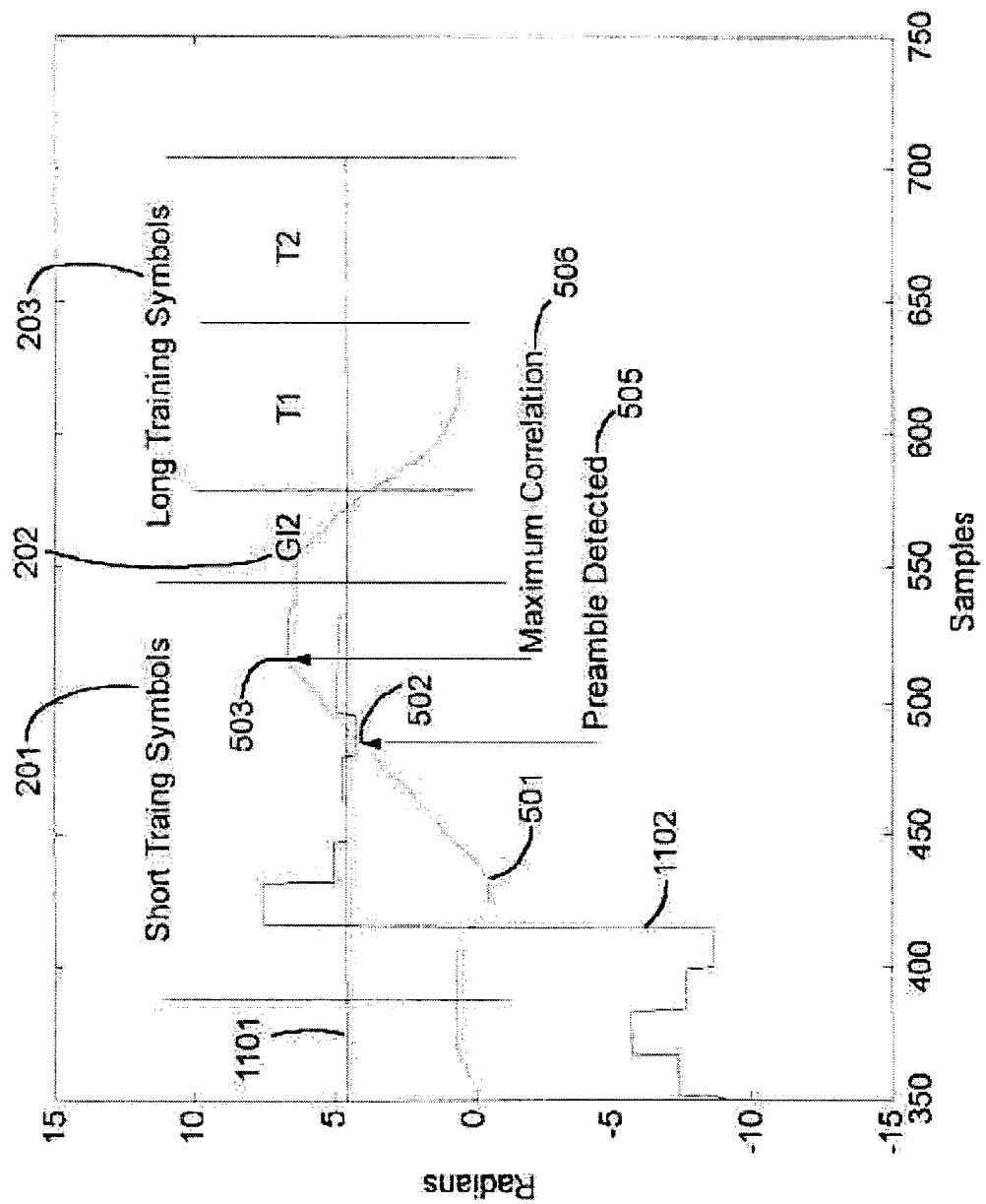
FIG. 11 depicts preamble detector operation in a 4 dB SNR environment.

FIG. 11 depicts the simulation results obtained from a MATLAB simulation of components described above. The simulation environment included a number of received signal impairments and a 4 dB signal to noise ratio ("SNR"). As shown, the OFDM signal is being transmitted with a simulated Frequency Offset 1101. Autocorrelation output function 501 starts to increase during the reception of Short Training Symbols 201, because they represent a repeated symbol sequence with the predetermined duration. The Coarse Frequency Offset Estimator may operate independently or with the benefit of feedback from the Preamble Detector. The Preamble Detected condition 505 occurs when autocorrelation function 501 reaches a predetermined threshold 502. Frequency Offset Estimation 1102 corresponds to Coarse Frequency Offset Estimation 421, and the simulation results show that Coarse Frequency Offset Estimation 421 converges to simulated Frequency Offset 1101. Furthermore, autocorrelation function 501 reaches Maximum Correlation 506, and function value 503 is stored accordingly. The value of function curve 501 decreases during GI2 Guard Interval 202, because the repetitive sequence of Short Training Symbols 201 is no longer received. Thus, the simulation illustrates the ability of the methods described to detect a preamble and align a symbol boundary in an environment having only a 4 dB SNR. This design accommodates an environment having only a 2 dB SNR with a packet error rate with 100 ns of delay spread of $10^{-2}$ or one error in 100. This is more robust than alternative systems.

Figure 12:
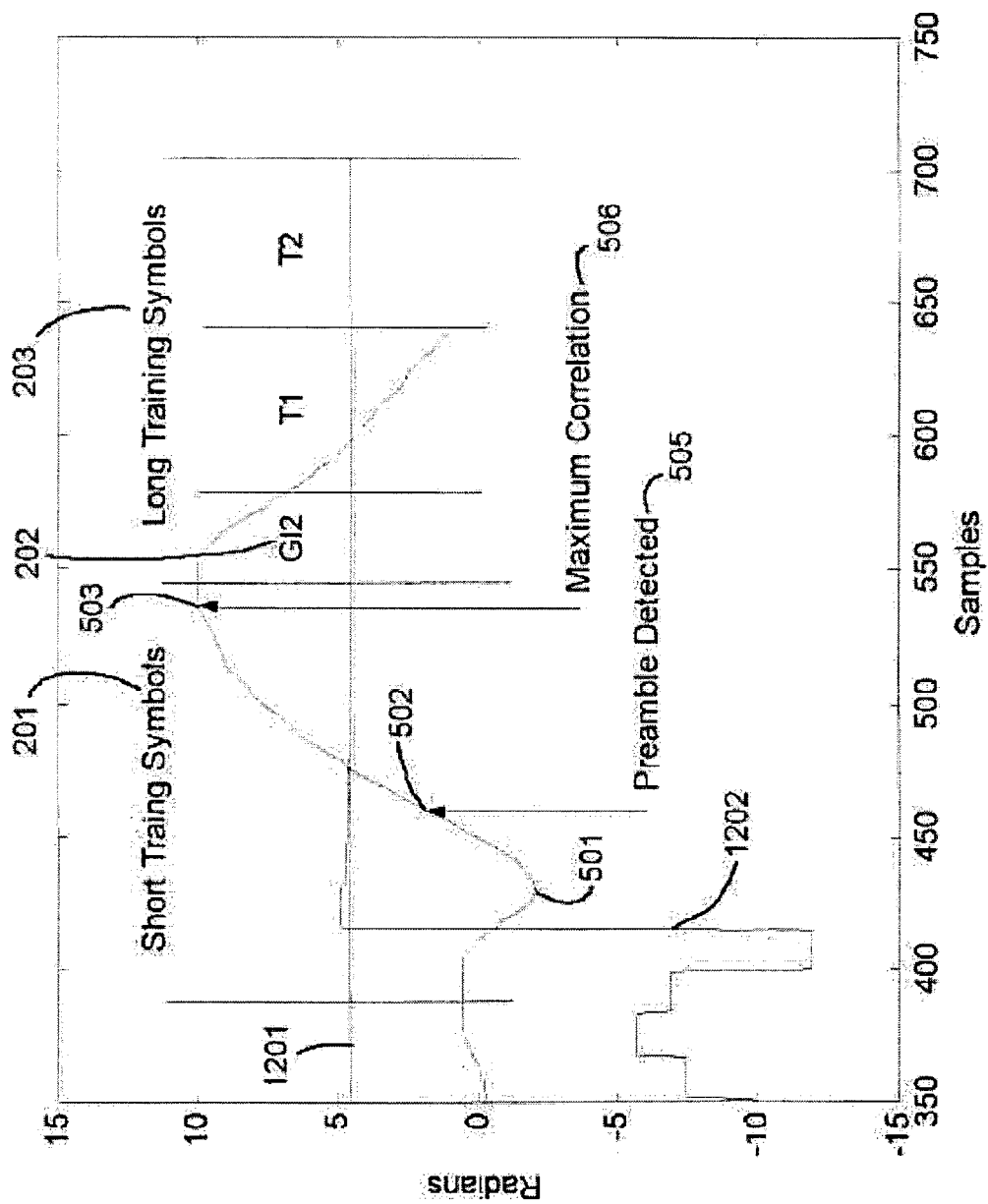
FIG. 12 depicts preamble detector operation in a 30 dB SNR environment.

FIG. 12 depicts the simulation results obtained in a similar environment to that of FIG. 11, with the exception that a 30 dB SNR is simulated. An increase in the SNR to 30 dB makes it easier to detect a preamble. The higher SNR results in an earlier Preamble Detected condition 505, because the autocorrelation function 501 is less impaired by noise. With decreasing noise, autocorrelation responds more quickly to repeated received Short Training Symbols 201. With decreasing noise, a higher Maximum Correlation 506 is expected. FIG. 12 also demonstrates the effect of increased SNR on Frequency Offset Estimation 1202, as shown by the shortened time in which Frequency Offset 1201 is reached. This reduced time results because, with improved SNR, fewer received samples of Short Training Symbols 201 are needed to achieve an accurate Frequency Offset Estimation.

Figure 13:
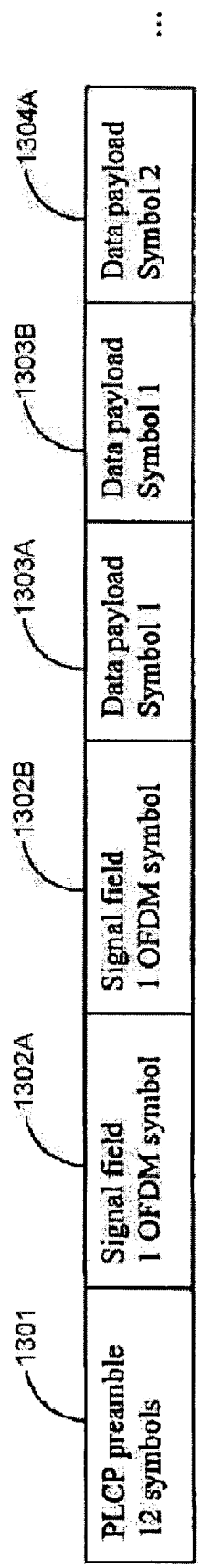
FIG. 13 depicts an 802.11a packet structure having 2-times symbol spreading.

FIG. 13 illustrates an 802.11a packet having duplicated OFDM symbols, thereby supporting a lower received SNR. Preamble 1301 comprises Short and Long Training Symbols and a Guard Interval. Following the preamble, OFDM symbols are repeated. A 2-times repeated spread is illustrated by FIG. 13. Of course, other amounts of spreading or redundancy can be applied, such as 3-times, 4 times, etc. In the 802.11a standard, a preamble is not intended to convey control information. If a transmitted preamble conforms strictly to specification standards, it will be recognized by all the stations in a network, including those which do not support redundant data transmission. The packet structure depicted in FIG. 13 may be utilized for embodiments that support spreading redundant data across the time domain or the frequency domain.

In the embodiment of FIG. 13, after the preamble is detected, information contained in one or more Signal field symbols 1302A and 1302B, is interpreted by the receiver to identify the amount of data redundancy of a received packet. Furthermore, the Signal field conveys information that enables the receiver to detect whether a received packet was transmitted in symbol spreading or normal modes. When spreading is used, the implementer chooses how to spread redundant data. Thus, the signal fields will be averaged out in the time domain or the frequency domain. In either case, the number of symbols will be increased by the spreading ratio. If the spreading ratio is 4, then a frame with spreading has 4 times more symbols in the frame, preamble excepted, than a frame with no spreading.

Alternatively, the preamble can be used to encode the use of spreading. For instance, alternate short or long training symbols could be utilized and the preamble detector modified accordingly. A receiver that is not equipped to process packets which utilize such alternate symbols would not properly interpret the modified preamble and would ignore (not detect) the packet. Other encoding methods of the preamble symbols could be used to signal and identify the symbol spreading being used.

Figure 14:
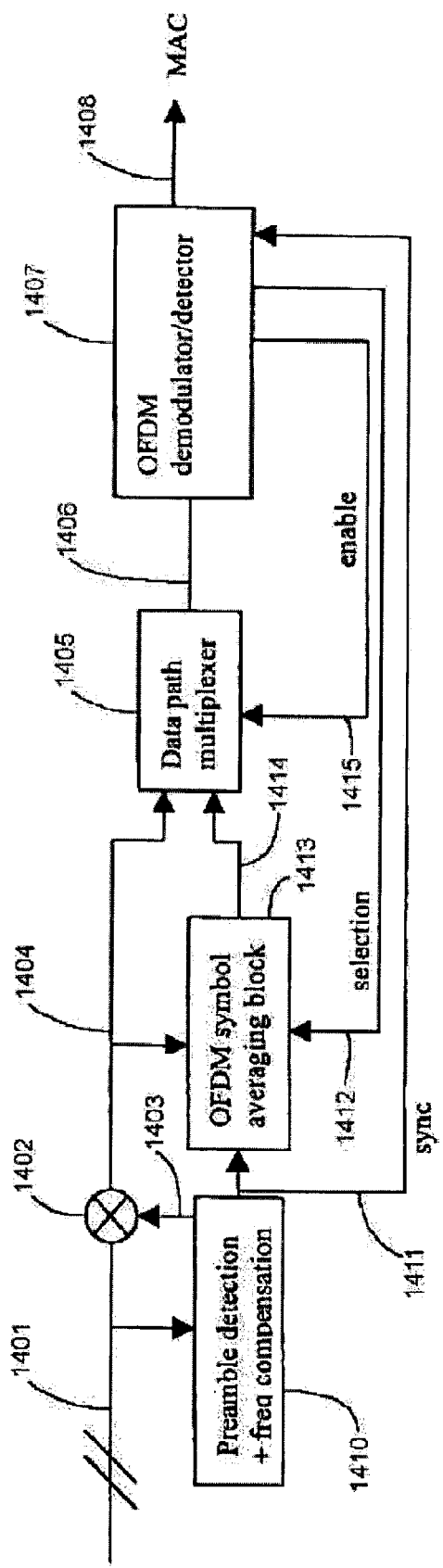
FIG. 14 depicts the block diagram of an embodiment for symbol spreading in the time domain.

FIG. 14 is a block diagram of an embodiment implementing time domain symbol spreading. A digitized stream of Complex Received Samples 1401 is processed by Preamble Detection and Frequency Compensation Block 1410, whose complex output signal 1403 is coupled to complex multiplier 1402, where it is multiplied by Complex Received Samples 1401, to produce a stream of Frequency Offset Compensated Complex Samples 1404. Preamble detector 1410 performs frequency offset estimation, frequency offset compensation, and symbol boundary detection. Synchronization information with respect to successive received symbol boundaries is provided to other components by preamble detector output signal Sync 1411.

OFDM symbol averaging block 1413 performs time domain averaging of Frequency Offset Compensated Complex Samples 1404. Averaging compensated complex samples forming successive OFDM symbols performs time averaging, because successive complex samples 1404 separated from each other by an OFDM symbol interval are summed and averaged in accordance with the time spreading ratio implemented. Thus, for 2-times spreading, received complex samples for two symbol intervals are averaged to recover one symbol; for 3-times spreading, complex samples over three symbol intervals are averaged to recover one symbol, etc. The resulting compensated and averaged complex samples stream 1414 is coupled to a second input of data path multiplexer 1405, and Frequency Offset Compensated Complex Samples 1404 are coupled to a first input of data path multiplexer 1405, whose output 1406 is coupled to OFDM demodulator/detector 1407. OFDM demodulator/detector 1407 performs various functions on complex samples stream 1406, including computing FFTs for each received OFDM symbol, equalizing the computed FFT subcarriers, and providing output control signals enable 1415 that is coupled to data path multiplexer 1405, and output signal selection 1412 that is coupled to OFDM symbol averaging block 1413.

For example, for a 2-times spreading ratio, preamble detector 1410 indicates the start of a first signal field symbol to OFDM symbol averaging block 1413, thereby signaling a received symbol boundary on Frequency Offset Compensated Complex Samples 1404, which have been grouped in accordance with successive OFDM symbol boundaries. Time domain averaging is performed in a manner that averages received complex samples occupying the same relative position in two successive OFDM symbols. Thus, the complex samples comprising signal fields 1302A and 1302B are averaged to yield a set of complex samples representing a single, averaged OFDM signal field.

Figure 15:
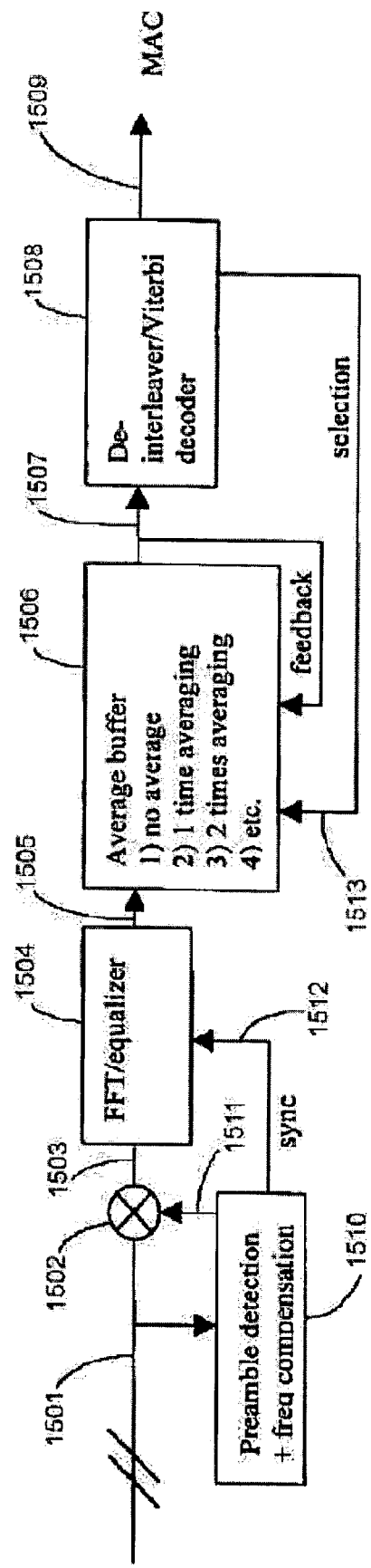
FIG. 15 depicts the block diagram of an embodiment for symbol spreading in the frequency domain.

FIG. 15 is a block diagram of an embodiment implementing spreading of redundant data across frequencies, which may be called frequency domain symbol spreading. A digitized stream of Complex Received Samples 1501 is processed by Preamble Detection and Frequency Compensation Block 1510, whose complex output signal 1511 is coupled to complex multiplier 1502, where it is multiplied by Complex Received Samples 1501, to produce a stream of Frequency Offset Compensated Complex Samples 1503. Preamble detector 1510 performs frequency offset estimation, frequency offset compensation, and symbol boundary detection. Synchronization with respect to successive symbol boundaries is provided to other components by preamble detector output signal Sync 1512. FFT/equalizer 1504 receives Frequency Offset Compensated Complex Samples 1503 and a Sync signal 1512, which it utilizes to compute the complex subcarrier elements 1505 comprising successive OFDM symbols, and may also compute their related equalization parameters.

Each OFDM symbol is composed of a plurality of subcarriers, and the data symbols can be located on different subcarriers over time, to enable frequency diversity. In one embodiment, data that in a first symbol is located on one subcarrier, on a subsequent symbol may be located on a different subcarrier. In another embodiment, data could be repeated on two or more subcarriers within the same symbol. The overall capacity and frequency efficiency obtained by symbol spreading in either embodiment will be the same if they implement the same spreading ratio.

Averaging buffer 1506 performs a de-spreading operation on the input stream of complex subcarrier elements 1505. Output signal 1507 consists of the de-spread and averaged information contained in the received subcarriers, for use by Interleaver/Viterbi decoder 1508 to perform the deinterleaving and decoding required to recover the Signal field and Data payload information. Output signal 1507 from the averaging buffer 1506 is also used to provide the feedback required to perform the averaging function. The signal field information may also be utilized to operate output signal Selection 1513.

Furthermore, configuration of Averaging Buffer 1506 may need to be performed after receipt of control information, which may be contained in the signal field, encoded in the preamble or otherwise incorporated in the packet. Because averaging starts following preamble detection, and cannot be delayed until after the De-interleaver/Viterbi decoder has recovered the necessary information, a delay mechanism is provided by the Averaging buffer to enable averaging operations over the received symbols. This delay mechanism, or buffer, operates at least until Selection line 1513 is stable, and stores received symbols while the De-interleaver/decoder determines that correct data is recovered.

This invention includes several aspects. One aspect is a method of detecting a preamble in an incoming signal stream comprising complex samples. The preamble includes a plurality of first symbols that are repeated at a first predetermined interval. The input signal stream is sampled to produce complex samples. The preamble includes a plurality of first symbols repeated at a first interval. The first symbols are not necessarily identical, but may be transformations of one another, which the preamble detector can nonetheless autocorrelate. For instance, the bits of the symbol sequence may be shifted or reversed in order. The method may include calculating successive autocorrelation values for pairs of complex samples separated by the first interval. The successive autocorrelation values are filtered to form a time-averaged autocorrelation signal. The method detects when the time-average autocorrelation signal exceeds a first threshold. The method further may include triggering a successive signal processing step following detecting the preamble. According to one aspect of the present invention, calculating successive autocorrelation values may include, for the complex sample pairs, conjugating one complex sample of the pair and multiplying the conjugated and unconjugated samples together to form a complex conjugate product. An angle approximation may be derived from the complex conjugate product. The closer the two values being autocorrelated are, the closer the point will be to a zero degree arc, the point resting on the positive t axis. Graphically, the complex conjugate product is a complex number that can be graphed on x and y or i and j axes. If the point is then represented using polar coordinates, the angle approximation corresponds to the polar angle. The angle approximation may be more or less accurate. On one hand, it may correspond to applying an arc tangent function to real and imaginary components of the complex conjugate product, yielding a close approximation of the polar angle. The arc tangent may be calculated or approximated using a table. On the other hand, the angle approximation may be very rough, such as described above, dividing an arc of pi radians into four equal arcs. This rough angle approximation can be implemented by comparing absolute magnitudes of real and complex parts of the complex conjugate and using the sign (positive or negative) of the real part of the complex conjugate product. Graphically, the complex conjugate product can be mapped onto one of the upper quadrants of the Cartesian graph. If the imaginary part of the complex conjugate product is of greater magnitude than the real part, the point lies closer to the t axis than to the x-axis. That is, it lies above quadrant bisectors extending at a 45 degree angle to horizontal from the origin. If the real part of the complex conjugate product is positive, the point lies in the right-hand quadrant. In this manner, too simple comparisons can be used to approximate the angle into one of four arcs. The angle can be mapped to one of four scalars. Similar procedures can be followed to mapped the angle into more than four arcs and more than four scalars. In further aspect of the present invention, filtering further includes applying two or more first-order filters to the successive autocorrelation values. Alternatively, a second-order or higher order filter could be applied. At least one of the filters applied may implement an infinite impulse response function. This function may be implemented either visually or in the time domain. Another aspect of the present invention is how the first threshold determined. It may be a predetermined value. Alternatively it may be determined in relation to background noise present input signal stream. It may be set as the ratio above the background noise level or a quantity above the background noise level. In another aspect of the present invention, the input stream may include data payload following the preamble. According to this aspect, the method may further in the signaling a start of the data payload and receiving the data payload with a predetermined the error rate. The start of the data payload may be signal based on the detecting first threshold or a detected and the second interval, as explained below.

The first embodiment further may be applied to a preamble that has at least a second interval following the first symbols. The second interval may be a guard interval, for instance, specified by an IEEE 802.11 family standard. More generally, the second interval may have a predetermined length or extent and does not repeat or autocorrelate with the first symbols. According to this aspect, the method further includes comparing the successive time-averaged autocorrelation signals and storing particular time-averaged autocorrelation signal values that exceed prior time-averaged autocorrelation signal values. Then, after the preamble has been detected, detecting a reduction of the successive time-averaged autocorrelation signals to a predetermined level below the stored time-averages autocorrelation signal. Effectively, the signal stream is observed and the drop-off in the signal stream that corresponds to arrival of the second interval is detected, because complex samples of the second interval do not autocorrelate with complex samples of the first symbols. The level at which a reduction is detected may be a proportion or ratio of the stored time-averaged autocorrelation signal. It may be a difference from the stored signal. It may be a constant. This embodiment further may include triggering a successive signal processing step following detection of the second interval. Calculation of successive autocorrelation values may proceed as described above. The predetermined level used to detect the reduction in successive time-averaged autocorrelation signals may be a fraction of the stored time-averaged autocorrelation signal, a difference from the stored time-average autocorrelation signal or a constant threshold. The end of the second interval or beginning of a third interval, such as long training symbols specified by an IEEE 802.11 family standard, may be estimated using the detected reduction in time-averaged autocorrelation signals, optionally taking into account the magnitude of the stored time-averaged autocorrelation signal, the signal-to-noise ratio or a proxy for the SNR, or another measure of signal strength for the input signal stream to adjust response to the decreasing autocorrelation signals.

The input signal stream of these various embodiments may be compliant with an OFDM standard, such as IEEE 802.11a or 802.11g, or one of the other standards referred to above. Compliance with a standard is meant in a commercially viable sense, not necessarily limited to or strictly compliant with each and every feature of the standard. Both present and future versions of the standards, such as future IEEE 802.11 family standards, are included.

Another embodiment of present invention is a digital device that detects a preamble in an input stream of complex samples, said preamble having a plurality of first symbols repeated at a first interval. The digital device, such as and FPGA, a gate array, a semi custom integrated circuit or a fully custom integrated circuit, include logic to calculate successive autocorrelation values for pairs of complex symbols separated by the first interval, to filter the successive autocorrelation values to form a time-averaged autocorrelation signal, and to detect when the time-averaged autocorrelation signal exceeds the first threshold. Aspects of this embodiment include any aspects of the first, method embodiment. In addition, this embodiment may include implementing the logic on an integrated circuit in further includes an onboard analog-to-digital converter that produces the complex samples. The logic to calculate successive autocorrelation values may use the conjugation and angle approximation aspects of the first embodiment. It also many include logic to detect a drop-off of the time-averaged autocorrelation signals when a second interval of the preamble arrives, as described above.

Another embodiment of the present invention is a method of estimating an end to a second interval, working on an input stream of complex samples, where the second interval follows a plurality of first symbols that are repeated at a first interval. The second interval may be a guard interval, for instance, specified by an IEEE 802.11 family standard. This method may include calculating autocorrelation values for pairs of complex samples separated by a predetermined interval.

The second interval may be a guard interval, for instance, specified by an IEEE 802.11 family standard. The method may include calculating successive autocorrelation values for pairs of complex samples separated by the first interval. The successive autocorrelation values are summed and filtered to form a time-average autocorrelation signal. Successive values of the time-average autocorrelation signal are compared. Particular time-average autocorrelation signal values that exceed prior time-average auto correlation signal values are stored. After the time-average autocorrelation signal has exceeded a first threshold, the method includes detecting reduction of the successive values of the time-average autocorrelation signal to a predetermined level below the stored time-average autocorrelation signal. The end of the second interval is estimated. Estimating the end of the second interval may include calculating a point in time beyond when the reduction is detected. This calculation optionally takes into account the magnitude of the stored time-averaged autocorrelation signal, the signal-to-noise ratio or a proxy for the SNR, or another measure of signal strength for the input signal stream to adjust response to the decreasing autocorrelation signals Another embodiment of the present invention is a digital device that estimates an end to a second interval in an input signal stream of complex samples. As with the method above, the second interval may be a guard interval, for instance. The digital device includes logic to calculate successive autocorrelation values for pairs of complex samples separated by the first interval, to sum and filter autocorrelation values to form a time-average autocorrelation signal, and to store at least some values of the time-average autocorrelation signal that exceed prior values of the time-average autocorrelation signal, the and, after the time-average autocorrelation signal has exceeded a first threshold, to detect reduction of the successive values of the signal to a level below the stored value. The method further may include logic to estimate the end of the second interval. This device may be implemented on an integrated circuit such as an FPGA or a gate array. The integrated circuit may further include an onboard analog-to-digital converter that produces the complex samples. In general, the device may include logic and resources to implement the method described above.

Another embodiment of the present invention is a method of aligning the processing of an input signal stream so a set of complex samples processed by a complex FFT begins at a boundary. In this method, the input signal stream includes instances of a repeated symbol, delimited by a boundary. The input signal stream includes complex samples representing a signal that includes plurality of subcarriers. At least some of the subcarriers are modulated with the repeated symbol. The method includes calculating complex FFT values for a set of the complex samples, wherein the sets spans a boundary between two repeated symbols. The results of the complex FFT are used to determine an average phase angle difference between the boundary and the set of samples. One aspect of the present invention is that the complex FFT values for pairs of subcarriers may be used to calculate the average phase angle difference. The method further includes aligning successive sets of the complex samples relative to the boundary. Another aspect of this embodiment includes determining from the average phase angle difference an offset between the set of complex samples and a boundary between the two repeated symbols. The average phase angle difference may be calculated according to either a general form of a summation function described above or a specific form of the summation function that is adapted to an IEEE 802.11 standard. In these forms, the expected modulation value of an indexed subcarrier may be 0, one or −1, or it may be restricted to one or −1.

Another embodiment of the present invention is a device that includes logic to practice the method of aligning processing of an input signal stream. Aspects of this device include the various aspects of the preceding method. They further including incorporating the device on an integrated circuit, such as an FPGA or a gate array. The device alternatively could be practiced as they a semi custom or fully custom integrated circuit.

Another embodiment of the present invention is a dual mode receiver with sensitive preamble detection. This method supports decoding a packet in an input signal stream, wherein the packet may be encoded in any of at least two encoding modes. The second mode would spread the data redundantly, as compared to the first mode. The input signal stream may be an OFDM signal or a signal compliant with any of the standards referred to above. This method includes detecting a preamble of the packet in the signal having a signal-to-noise ratio at the receiver of 2 or 4 dB with a packet error rate of $10^{-2}$ and decoding a data payload of the packet with a predetermined error rate for signals of the first and second modes, wherein effective operating condition for the second mode is at least 3 dB less signal-to-noise ratio at the receiver than for the first mode. The simulation above demonstrates that the preamble may be detected according to the present method in a signal having a signal-to-noise ratio at the receiver 4 dB or better. The design is to operate at 2 dB or better. The safety margin for actual implementation of the simulated results may be detecting a preamble at an SNR of 5 dB or better.

A device embodying the two mode receiver with sensitive preamble detection includes a data payload detector capable of achieving a predetermined bit error rate for signals of the first mode and further capable of achieving the predetermined bit error rate for signals of the second mode, wherein an effective operating condition for the second mode is at least 3 dB less signal-to-noise ratio to receiver than for the first mode. Also acting on the input signal is a preamble detector capable of detecting preambles for signals having a signal-to-noise ratio at the receiver of 2 or 4 dB. Again, the simulation above demonstrates that a preamble may be detected by a device implementing the present invention in a signal having a signal-to-noise ratio at the receiver of 4 dB or better and the design is to operate at 2 dB or better. Similarly, actual implementation of the simulated results may involve detecting a preamble at an SNR of 5 dB or better. One aspect of this device is that the payload detector and preamble detector may be combined on a single integrated circuit, such as an FPGA or a gate array. This integrated circuit further may include an analog-to-digital converter that produces complex samples utilized by the preamble detector and data payload detector.

Another embodiment of the present invention is a method of receiving a packet in an input signal stream of complex samples, wherein the packet includes a preamble and a data payload. The preamble of the signal includes plurality of first symbols repeated at a first predetermined interval. The method includes calculating successive autocorrelation values for pairs of complex samples delimited by the first interval and filtering the successive autocorrelation values to form a time-average autocorrelation signal. The method further may include detecting when said time-average autocorrelation signal exceeds a predetermined first threshold, aligning sampling of the data payload to a boundary and determining whether the data payload is encoded according to a first mode or a redundantly spread second mode. A further aspect of this embodiment may include decoding the data payload. Determining the data mode of transmission may involve decoding first symbols that are repeated but transformed from one another or it may involve interpreting a signal field, which may be transmitted once or may be spread. Generally, aspects of this method may include aspects of the other methods embodying the present invention. For instance, calculating successive autocorrelation values for complex sample pairs may include conjugating one complex sample of the complex sample pairs and multiplying the complex sample pair together after conjugation to form a complex conjugate product, then determining an angle approximation from the complex conjugate product. Aspects and methods related to the angle approximation are described above.

Another embodiment of the present invention is a method that builds upon the previous embodiment, wherein the preamble has at least a second interval that follows the first symbols. The second interval may be a guard interval, as in the IEEE 802.11 family of specifications. The second interval has a predetermined extent and does not repeat or does not autocorrelate with the first symbols. This method may include comparing successive time-averaged autocorrelation signals and storing particular time-averaged autocorrelation signal values that exceed prior time-averaged autocorrelation signal values and detecting reduction of the successive time-averaged autocorrelation signals to level below the stored time-averaged autocorrelation value. The level may be a predetermined level that is a proportion or ratio of the stored time-averaged autocorrelation value. It may be a level at a predetermined difference below the stored time-averaged autocorrelation value. Or it may be a constant. This embodiment further may include, for complex sample pairs, conjugating one complex sample of the complex sample pair and multiplying the complex sample pair together after conjugation to form a complex conjugate product, then determining an angle approximation from the complex conjugate product. Additional aspects of the angle determination and of estimating an end of the second interval applied described in prior embodiments may be applied to this embodiment. This embodiment further may include determining which of two or more modes have been used for the data payload and decoding the data payload accordingly. The packet may include signal field specifies a data redundancy parameter. The signal field may be repeated one or more times. The signal field will be interpreted. Alternatively, the preamble may be encoded to vary instances of the first symbols a predetermined matter and the preamble detector may detect when the preamble has been encoded. According to this aspect, the steps of calculating successive autocorrelation values and determining the encoding mode may operate concurrently. For instance, preamble detector logic may simultaneously autocorrelate sample pairs on the assumptions that the preamble is encoded according to the first and second modes. Detection of the preamble by one section of the logic or the other may determine the encoding mode. A further aspect of this embodiment is that decoding the data payload include applying a Viterbi detector.

A further aspect of the present invention includes the method of aligning input signal processing to an inter-symbol boundary between repeated symbols, wherein the input signal includes a stream of complex samples from the signal. The signal comprises encoded symbols further comprising a plurality of subcarriers and the subcarriers are encoded with subcarrier modulation values. This method may include calculating a plurality of FFTs from sets of the complex samples, wherein the sets span parts of two received repeated symbols. The complex FFT is used to calculate the received subcarrier modulation values from the stream of complex samples. An average phase angle difference may then be calculated for the signal, using the received and expected modulation values for pairs of subcarriers. The phase angle difference corresponds to the degree of misalignment between the received and expected symbol boundaries. Determination of the average phase angle difference between the stream of complex samples and the expected symbol boundary can thus be used to align the FFT sampling more closely with the received inter-symbol boundary. The formulas given above can be used to calculate the average phase angle difference. It is noted in the above formulas that the expected modulation values may be 0, 1 or −1, if the received sequence of preamble modulation values are transmitted in accordance with an IEEE 802.11a model.

An additional aspect of the present invention is a method and corresponding device for receiving OFDM symbols transmitted in any of at least two modes. The second mode spreads a data payload redundantly, at least relative to the first mode. In operation, a data payload detector decodes first mode signals and achieves a predetermined bit error rate for signals having not less than a first signal-to-noise ratio. The payload detector decodes second mode signals and achieves the predetermined bit error rate for signals having not less than a second SNR. The payload detectors are operable after a preamble detector, capable of detecting preambles in signals having an SNR, which may be less than the second SNR, and thus the payload detector may recover a data packet having not less than the second SNR. As further described above, the data payload may be redundantly spread in the time domain, or it may be redundantly spread in the frequency domain.

A further embodiment of the present invention is a receiver capable of receiving a packet in a signal transmitted in any of at least two modes, including a first mode and a second mode in which the data payload has been redundantly spread relative to the first mode. The signal may be an OFDM signal or it may be compliant with any of the standards referred to above. This device operates on an input stream of complex samples. The packet includes a preamble and the data payload. The preamble includes a plurality of first symbols repeated at a predetermined first interval. The device includes logic to calculate successive autocorrelation values for pairs of complex samples separated by the first interval. It further includes logic to filter the successive autocorrelation values to form a time-averaged autocorrelation signal and detect when said time-averaged autocorrelation signal exceeds a predetermined first threshold. The device further includes logic to align sampling of the data payload to a boundary of within the packet, to determine whether the data payload is encoded according to a first mode or a redundantly spread second mode and to decode the data payload accordingly. A further aspect of this receiver is that the data payload detector and preamble detector may be implemented a single integrated circuit. The logic to calculate successive sets of autocorrelation values described in prior embodiments may applied to this embodiment as well.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to implement the methods, media impressed with logic to carry out the methods, signal streams impressed with logic to carry out the methods, or computer-accessible processing services. It is contemplated that modifications and combinations will readily occur to those skilled in the art, which modifications and combinations will be within the spirit of the invention and the scope of the following claims.

We claim as follows:

1. A method of aligning input signal stream processing to a boundary between instances of a repeated symbol, wherein the input signal stream includes complex samples, the complex samples represent a signal band that includes a plurality of subcarriers, and at least some of the subcarriers are modulated with the repeated symbol, the method including:
    calculating complex FFT values for a set of the complex samples, wherein the set spans an actual boundary between two repeated symbols;
    determining an average phase angle difference between the actual boundary and the set of the complex samples, utilizing the calculated complex FFT values and expected FFT values for the pairs of subcarriers; and
    aligning successive sets of the complex samples relative to the boundary.

2. The method of claim 1, further including determining from the average phase angle difference an offset between the set of complex samples and the boundary between the two repeated symbols.

3. The method of claim 1, wherein the average phase angle difference corresponds to a function of $$\sum_{k=-N/2}^{k=N/2-1} C_k C_{k+1}^* L_k^* L_{k+1}$$

wherein
k is an index ranging across N subcarriers,
C is a received subcarrier modulation value of the indexed subcarrier,
C is a conjugate of a received subcarrier modulation value of the indexed subcarrier;
L is an expected modulation value of the indexed subcarrier, and
L* is a conjugate of an expected modulation value of the indexed subcarrier.

4. The method of claim 3, wherein L has a value of 0, 1, or −1.

5. The method of claim 1, wherein the signal and the two repeated symbols comply with an IEEE 802.11 standard, and the average phase angle difference corresponds to a function of $$\sum_{k=-26}^{k=25} C_k C_{k+1}^* L_k^* L_{k+1}$$

wherein
k is an index ranging across 802.11-compliant subcarriers,
C is a received subcarrier modulation value of the indexed subcarrier,
C* is a conjugate of a received subcarrier modulation value of the indexed subcarrier, L is an expected modulation value of the indexed subcarrier, and L* is a conjugate of an expected modulation value of the indexed subcarrier.

6. The method of claim 5, wherein L, has a value of 1+0j or −1+0j.

7. A device that aligns processing of an input signal stream to a boundary between instances of a repeated symbol, wherein the input signal stream includes complex samples, the complex samples represent a signal band that includes a plurality of subcarriers, and at least some of the subcarriers are modulated with the repeated symbol, the device including logic to:

calculate complex FFT values for a set of the complex samples, wherein the set spans an actual boundary between two repeated symbols;

determine an average phase angle difference between the actual boundary and the set of the complex samples, utilizing the calculated complex FFT values and expected FFT values for the pairs of subcarriers; and align successive sets of the complex samples relative to the boundary.

8. The device of claim 7, further including logic to determine from the average phase angle difference an offset between the set of complex samples and the boundary between the two repeated symbols.

9. The device of claim 7, implemented in an FPGA.

10. The device of claim 7, implemented in a gate array.

11. The device of claim 7, implemented on an integrated circuit.

12. The device of claim 7, implemented on an integrated circuit and further including an onboard analog to digital converter that produces the complex samples.

13. The device of claim 7, wherein the average phase angle difference corresponds to a function of $$\sum_{k=-N/2}^{k=N/2-1} C_k C_{k+1}^* L_k^* L_{k+1}$$

wherein k is an index ranging across N subcarriers,

C is a received subcarrier modulation value of the indexed subcarrier

C* is a conjugate of a received subcarrier modulation value of the indexed subcarrier, L is an expected modulation value of the indexed subcarrier, and L* is a conjugate of an expected modulation value of the indexed subcarrier.

14. The device of claim 13, wherein L has a value of 0, 1, or −1.

15. The device of claim 7, wherein the signal and the two repeated symbols comply with an IEEE 802.11 standard, and the average phase angle difference corresponds to a function of $$\sum_{k=-26}^{k=25} C_k C_{k+1}^* L_k^* L_{k+1}$$

wherein k is an index ranging across 802.11'-compliant subcarriers,

C is a received subcarrier modulation value of the indexed subcarrier,

C* is a conjugate of a received subcarrier modulation value of the indexed subcarrier, L is an expected modulation value of the indexed subcarrier, and L* is a conjugate of an expected modulation value of the indexed subcarrier.

16. The device of claim 15, wherein L has a value of 1+0j or −1+0j.

* * * * *